United States Patent
Diab et al.

(10) Patent No.: US 9,356,699 B2
(45) Date of Patent: May 31, 2016

(54) DYNAMIC READJUSTMENT OF ENERGY EFFICIENT NETWORK CONTROL POLICY PARAMETERS IN AN OPTICAL NETWORK UNIT BASED ON A SIEPON PROTOCOL

(71) Applicant: Broadcom Corporation, Irvine, CA (US)

(72) Inventors: Wael William Diab, San Francisco, CA (US); Ryan Hirth, Windsor, CA (US); Lowell D. Lamb, San Ramon, CA (US); Glen Kramer, Petaluma, CA (US)

(73) Assignee: BROADCOM CORPORATION, Irvine, CA (US)

( * ) Notice: Subject to any disclaimer, the term of this patent is extended or adjusted under 35 U.S.C. 154(b) by 41 days.

(21) Appl. No.: 13/671,642

(22) Filed: Nov. 8, 2012

(65) Prior Publication Data

US 2014/0112663 A1  Apr. 24, 2014

Related U.S. Application Data

(60) Provisional application No. 61/717,147, filed on Oct. 23, 2012.

(51) Int. Cl.
*H04B 10/20* (2006.01)
*H04J 14/00* (2006.01)
*H04B 10/27* (2013.01)
*H04L 12/12* (2006.01)

(52) U.S. Cl.
CPC ............... *H04B 10/27* (2013.01); *H04L 12/12* (2013.01); *Y02B 60/32* (2013.01); *Y02B 60/34* (2013.01); *Y02B 60/35* (2013.01); *Y02B 60/43* (2013.01); *Y02B 60/44* (2013.01)

(58) Field of Classification Search
USPC ................................................ 398/58, 59, 72
See application file for complete search history.

(56) References Cited

U.S. PATENT DOCUMENTS

| | | | | |
|---|---|---|---|---|
| 2008/0212964 A1* | 9/2008 | Gao | ...................... | H04J 3/1694 398/58 |
| 2010/0110952 A1* | 5/2010 | Diab | ...................... | H04L 12/12 370/311 |
| 2010/0111523 A1* | 5/2010 | Hirth | ...................... | H04B 10/27 398/25 |
| 2010/0115117 A1* | 5/2010 | Diab | ...................... | H04L 12/12 709/230 |
| 2011/0161522 A1* | 6/2011 | Diab | ...................... | H04L 49/35 709/246 |
| 2011/0252257 A1* | 10/2011 | Diab | ...................... | H04L 12/12 713/323 |
| 2012/0287829 A1* | 11/2012 | Chang | ...................... | H04L 5/16 370/296 |
| 2013/0077972 A1* | 3/2013 | Zhang | ...................... | H04L 12/12 398/58 |

OTHER PUBLICATIONS

IEEE P1904.1™/D3.0 Draft Standard for Service Interoperability in Ethernet Passive Optical Networks (SIEPON), Aug. 2012.
Michael J. Bennett and Lowell D. Lamb, "Energy Efficiency in IEEE Ethernet Networks—Current Status and Prospects for the Future," Sep. 22, 2012.

* cited by examiner

*Primary Examiner* — David Payne
*Assistant Examiner* — Pranesh Barua
(74) *Attorney, Agent, or Firm* — Foley & Lardner LLP; Joseph N. Ziebert; Angela D. Murch

(57) ABSTRACT

A dynamic readjustment of an energy efficient network control policy parameters in an optical network unit based on a Service Interoperability in Ethernet Passive Optical Network (SIEPON) protocol. The access link between the OLT and ONU has distinct properties that can be used to enhance the energy efficiency control policy on the network facing side of the ONU. In one embodiment, an adjustment mechanism can be based on the receipt, by an optical interface in an ONU, of a control command from an upstream OLT, wherein the control command is configured to provide a limitation on an available time period during which the ONU can communicate with the OLT over an optical fiber cable.

20 Claims, 6 Drawing Sheets

DYNAMIC READJUSTMENT OF ENERGY EFFICIENT NETWORK CONTROL POLICY PARAMETERS IN AN OPTICAL NETWORK UNIT BASED ON A SIEPON PROTOCOL

This application claims priority to provisional application No. 61/717,147, filed Oct. 23, 2012, which is incorporated herein by reference in its entirety.

BACKGROUND

1. Field of the Invention

The present invention relates generally to energy efficiency and, more particularly, to the dynamic readjustment of an energy efficient network control policy parameters in an optical network unit based on a Service Interoperability in Ethernet Passive Optical Network (SIEPON) protocol.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
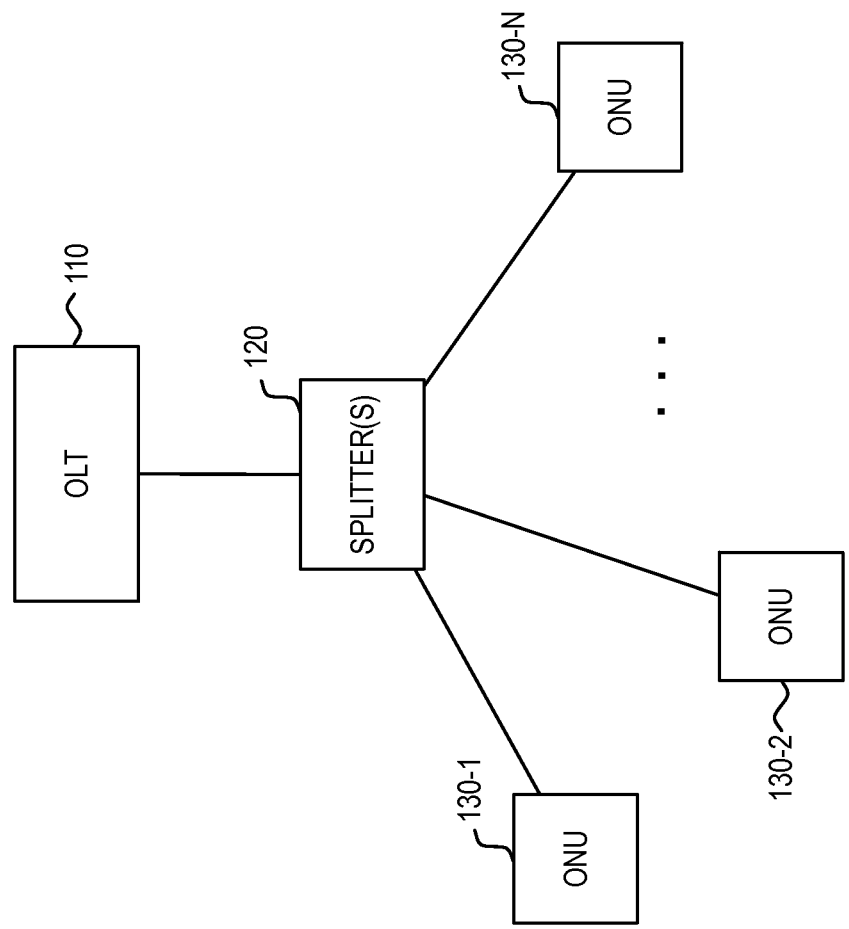
FIG. 1 illustrates an example of a point-to-multipoint communication network.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In a point-to-multipoint system such as an Ethernet passive optical network (EPON), a single optical line terminal (OLT) at a head end can be designed to communicate with a plurality of optical network units (ONUs) at various end nodes. The ONUs, which can also be referred to as customer nodes, can be combined with other service-specific functions. For example, the ONU can also be designed to include a control CPU, a media converter, customer premises equipment, a switch (e.g., for MDU or SMB type ONUs), a gateway, or the like. These various service-specific functions can be designed to leverage an energy efficiency control policy efforts to conserve power in the customer network.

The access link between the OLT and ONU has distinct properties that can be used to enhance the energy efficiency control policy on the network facing side of the ONU. In one example, the OLT and ONU have a relationship whereby the ONU is given an effective bandwidth and duty cycle based on a process that can be managed by the Service Interoperability EPON (SIEPON) protocol. As would be appreciated, the effective bandwidth can be changed throughout the life of the access link based on a number of factors such as time of day, overall network demand, Service Level Agreement (SLA) that the customer is holding, etc. In another example, the SIEPON protocol can be used to manage power savings in the optical interface at the ONU through a power saving initiation command that can enable the optical interface to cycle between a sleep mode and an active mode.

In the present invention, it is recognized that the energy efficiency control policy parameters in the ONU can be adjusted based on changes effected by the management protocol (e.g., SIEPON) at the ONU. In one embodiment, an adjustment mechanism can be based on the receipt, by an optical interface in an ONU, of a control command from an upstream OLT, wherein the control command is configured to provide a limitation on an available time period during which the ONU can communicate with the OLT over an optical fiber cable. In accordance with the limitation on the available time period during which the ONU can communicate with the OLT, one or more parameters can be loaded into a control register that is accessible by an energy efficiency control policy, which controls transitions by at least part of a downstream network interface of the ONU between different power states. Operation of the energy efficiency control policy can then be performed using the one or more parameters that are loaded from the control register at a time proximate to an event controlled by the control command. In various examples, the one or more parameters can include a parameter that impacts latency of the network interface, a parameter that impacts a length of a wake up time period of the network interface, a parameter that impacts an amount of buffering available to the network interface, etc.

FIG. 1 illustrates an example of a point-to-multipoint communication network. As illustrated, the point-to-multipoint network includes a single OLT 110 that communicates with a plurality of ONUs 130-*n* via a PON. The illustrated PON includes splitter(s) 120, which enable a single feeder cable to be split into multiple drop cables for the individual ONUs 130-*n*. Each ONU 130-*n* can interface with a non-PON domain such as that supported by further coaxial cable, copper twisted pair, fiber optic media, wireless, etc. network links.

Here, it should be noted that the PON domain can represent an EPON such as that defined by IEEE 802.3, GPON, BPON, xGPON, or NGPON defined by ITU-T, BIPON, or the like. In general, the advantage of the PON is that it allows sharing of the fiber optic plant by multiple network nodes. In the downstream direction, OLT 110 is configured to broadcast frames containing packets to the ONUs that are responsible for extracting the particular packets that are destined for that location, while in the upstream direction the ONUs are designed to transmit in a way to avoid collisions between the packets using, for example, a time division multiple access (TDMA) communication protocol. Here, it should be noted that the PON domain can also be based on coaxial cabling such as that provided by EPON over Coax (EPoC) systems.

Figure 2:
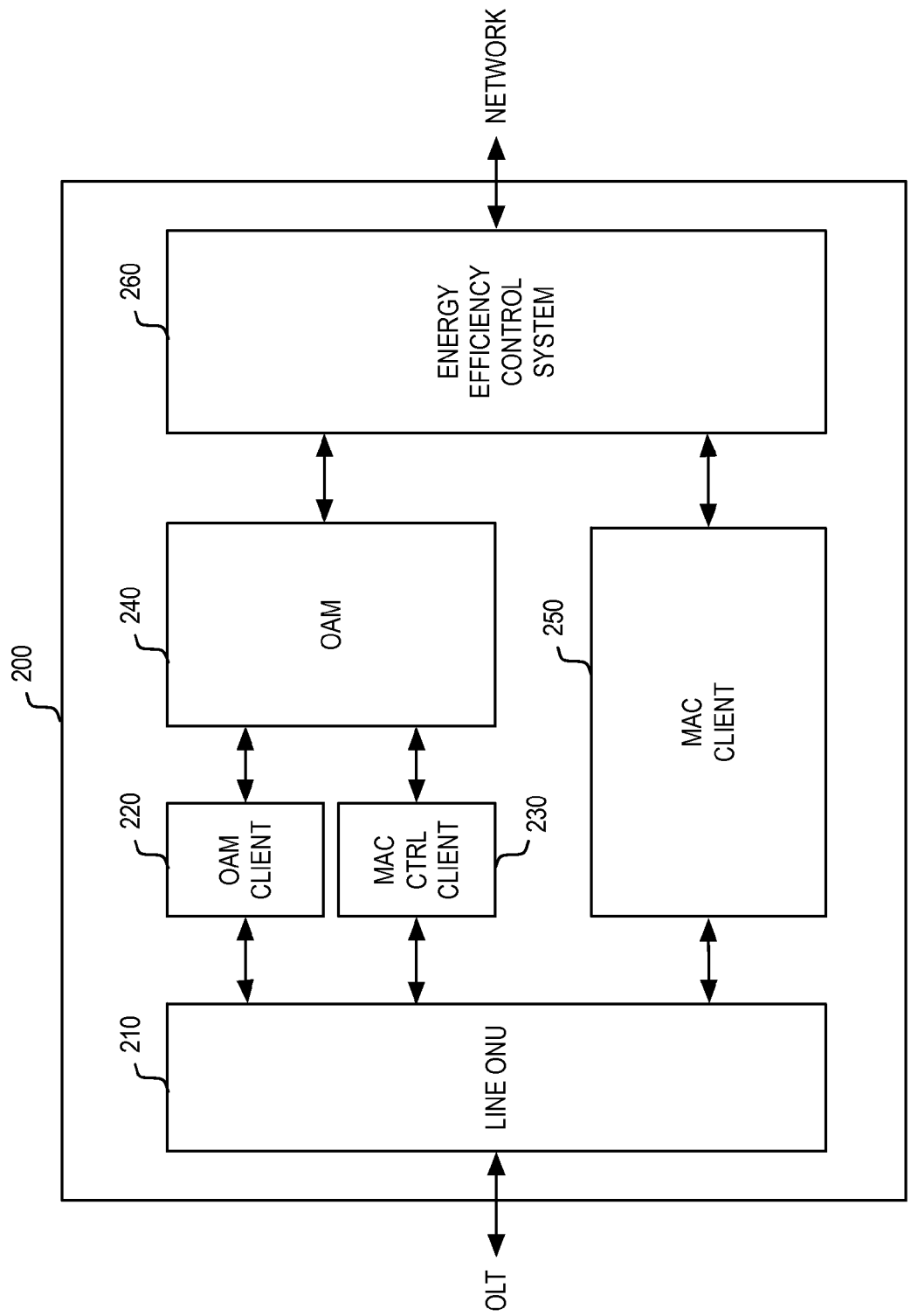
FIG. 2 illustrates an example of an optical network unit including an energy efficiency control system.

FIG. 2 illustrates an example of an optical network unit including an energy efficiency control system. As illustrated, ONU 200 includes Line ONU 210. In one example applied to IEEE 802. EPON, Line ONU 210 includes a physical layer device (PHY), PON media access control (MAC), and extended PON protocols, which further includes a lower layer Multi-Point Control Protocol (MPCP) and a higher layer Operation, Administration and Maintenance (OAM). In another example applied to ITU-T GPON, the extended PON protocols includes a lower layer Physical Layer Operations and Maintenance (PLOAM) and a higher layer Operation Management Control Interface (OMCI). In general, the extended PON protocols in ONU 200 is designed to cooperate with corresponding extended PON protocols in the OLT in providing end-to-end services.

As illustrated OAM 240 interacts with Line ONU 210 via OAM client 220 and MAC Control Client 230. In general, OAM 240 can facilitate discovery and registration, GATE processing, and REPORT generation via MAC Control Client 230, and can facilitate alarms, statistics, provisioning, authentication, Internet Group Management Protocol (IGMP)/Multicast Listener Discovery (MLD), Simple Network Management Protocol (SNMP), power saving and protection via OAM Client 230.

Finally, MAC Client 250 facilitates data services from Line ONU 210 to a non-PON domain represented by energy efficiency control system 260. As illustrated, energy efficiency control system 260 facilitates a connection of ONU 200 to a client facing network.

Energy efficiency control system 260 can attempt to save power when the traffic utilization of the network is not at its maximum capacity. Here, an energy efficiency control protocol can be used to minimize a transmission performance impact while maximizing energy savings. At a broad level, an energy efficiency control policy for a particular link in the network determines when to enter an energy saving state, what energy saving state (i.e., level of energy savings) to enter, how long to remain in that energy saving state, what energy saving state to transition to out of the previous energy saving state, etc. In one embodiment, energy efficiency control policies can base these energy-saving decisions on a combination of settings established by an IT manager and the properties of the traffic on the link itself.

Figure 3:
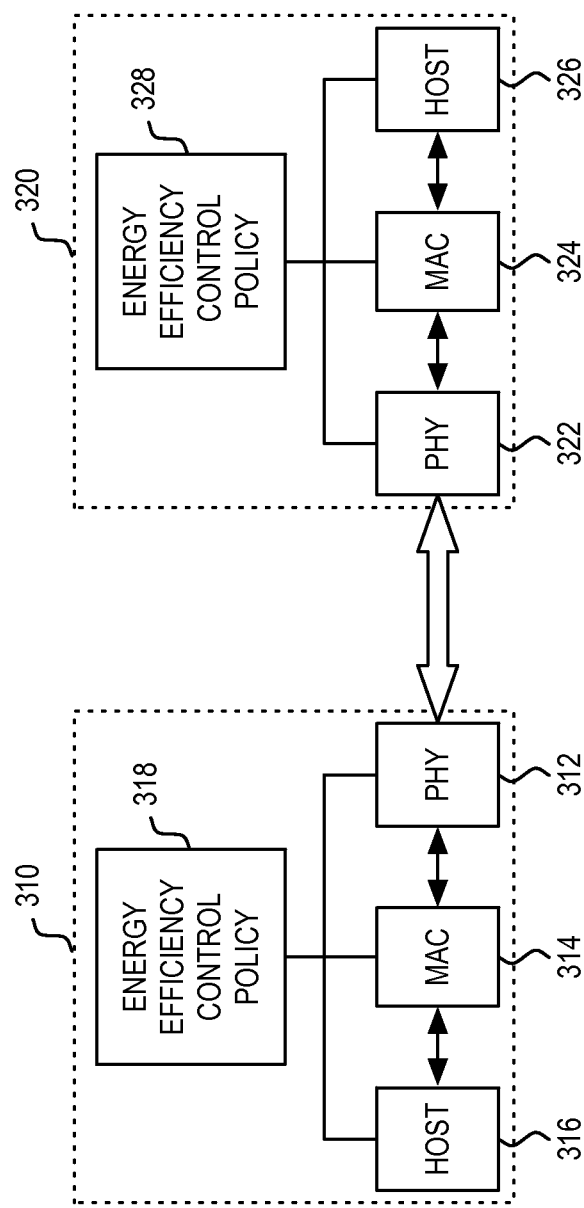
FIG. 3 illustrates an example link using energy efficiency control systems.

FIG. 3 illustrates an example link that includes energy efficiency control system 260. As illustrated, the link supports communication between a first link partner 310 such as energy efficiency control system 260 and a second link partner 320. In various embodiments, link partners 310 and 320 can represent a switch, router, endpoint (e.g., server, client, VoIP phone, wireless access point, etc.), or the like. As illustrated, link partner 310 includes PHY 312, MAC 314, and host 316, while link partner 320 includes PHY 322, MAC 324, and host 326.

In general, hosts 316 and 326 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 314 and 324 may provide the necessary services to hosts 316 and 326 to ensure that packets are suitably formatted and communicated to PHYs 312 and 322, respectively. MAC controllers 314 and 324 may comprise suitable logic, circuitry, and/or code that may enable handling of data link layer (Layer 2) operability and/or functionality. MAC controllers 314 and 324 can be configured to implement Ethernet protocols, such as those based on the IEEE 802.3 standard, for example. PHYs 312 and 322 can be configured to handle physical layer requirements, which include, but are not limited to, packetization, data transfer and serialization/deserialization (SERDES).

As FIG. 3 further illustrates, link partners 310 and 320 also include energy efficiency control policy entities 318 and 328, respectively. In general, energy efficiency control policy entities 318 and 328 can be designed to determine when to enter an energy saving state, what energy saving state (i.e., level of energy savings) to enter, how long to remain in that energy saving state, what energy saving state to transition to out of the previous energy saving state, etc.

In general, energy efficiency control policy entities 318 and 328 can comprise suitable logic, circuitry, and/or code that may be enabled to establish and/or implement an energy efficiency control policy for the network device. In various embodiments, energy efficiency control policy entities 318 and 328 can be a logical and/or functional block which may, for example, be implemented in one or more layers, including portions of the PHY or enhanced PHY, MAC, switch, controller, or other subsystems in the host, thereby enabling energy-efficiency control at one or more layers.

In one example, energy efficient Ethernet such as that defined by IEEE 802.3az can provide substantial energy savings through the use of a low power idle mode and/or subrating. In general, the low power idle mode can be entered when a transmitter enters a period of silence when there is no data to be sent. Power is thereby saved when the link is off. Refresh signals can be sent periodically to enable wake up from the sleep mode.

Subrating can be used to reduce the link rate to a sub-rate of the main rate, thereby enabling a reduction in power. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

In general, both the subrating and low power idle techniques involve turning off or otherwise modifying portions of the PHY during a period of low link utilization. As in the PHY, power savings in the higher layers (e.g., MAC) can also be achieved by using various forms of subrating as well.

In the present invention, it is recognized that the operation of the energy efficiency control policies within the energy efficiency control system 260 can benefit from knowledge of the configured operation of the ONU. This knowledge of the configured operation can be used to adjust the energy efficiency control policy, thereby enhancing the ability of the energy efficiency control policy to operate in an optimized manner. Conventionally, the access portion of the ONU, which includes Line ONU 210, operates independently of energy efficiency control system 260. This independent operation leads to various inefficiencies. For example, in failing to recognize that the access portion of the ONU can operate in various different operating states (e.g., sleep and wake states), the energy efficiency control policy can at best be designed to target an operating environment representative of an average between the different operating states. This is far less optimal as compared to a dynamic operation of the energy efficiency control policy that can have distinct optimizations designed to interoperate with distinct operating states of the ONU.

Discovery of the ONU state by the energy efficiency control system can therefore provide great value in enabling a dynamic operation of the energy efficiency control system. In general, the access link provided by the OLT/ONU have various distinct properties that can be useful to the operation of the energy efficiency control system. For example, the OLT/ONU has a relationship whereby the ONU is given an effective bandwidth and duty cycle based on an algorithm that is managed by the SIEPON protocol. This effective bandwidth can be changed throughout the life of the access link based on a number of factors such as the time of day, overall network demand, Service Level Agreement (SLA) for the customer, etc. In another example, the SIEPON protocol can be used to send a power saving initiation command from the OLT to the ONU. This power saving initiation command can be used to instruct the ONU to transition some of its subsystems in the transmit path and optionally in the receive path to power down to save energy. In response to this power saving initiation command, the ONU would be configured to execute a series of power saving cycles, wherein each power saving cycle includes an active mode time period where all of the subsystems are powered up and fully functional and a sleep mode time period where some of the subsystems are powered down to save energy.

Figure 4:
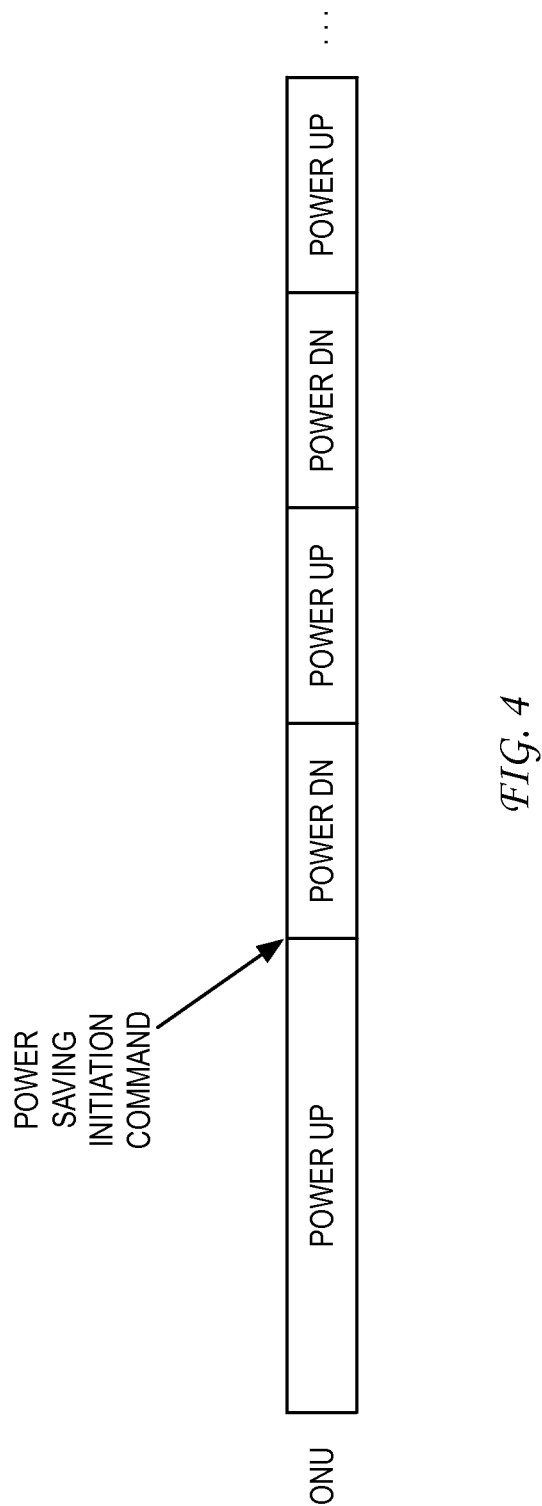
FIG. 4 illustrates an example of a receipt of a power saving initiation command by the optical network unit.

FIG. 4 illustrates the power saving cycle in the access portion of the ONU. As illustrated, the ONU can receive a power saving initiation command from the OLT while in the active mode where all of the subsystems are powered up. After acknowledging the receipt of the power saving initiation command, the ONU can then transition into a power saving mode where the ONU will cycle between active mode time periods and sleep mode time periods.

As noted, it is a feature of the present invention that the discovery of the ONU state can be useful in enabling a dynamic operation of the energy efficiency control system. In the example of an ONU that has enters a power saving mode where it cycles between active mode time periods and sleep mode time periods, such ONU state information can be used by the energy efficiency control system in dynamically configuring the parameters for the energy efficiency control policy contained therein.

Figure 5:
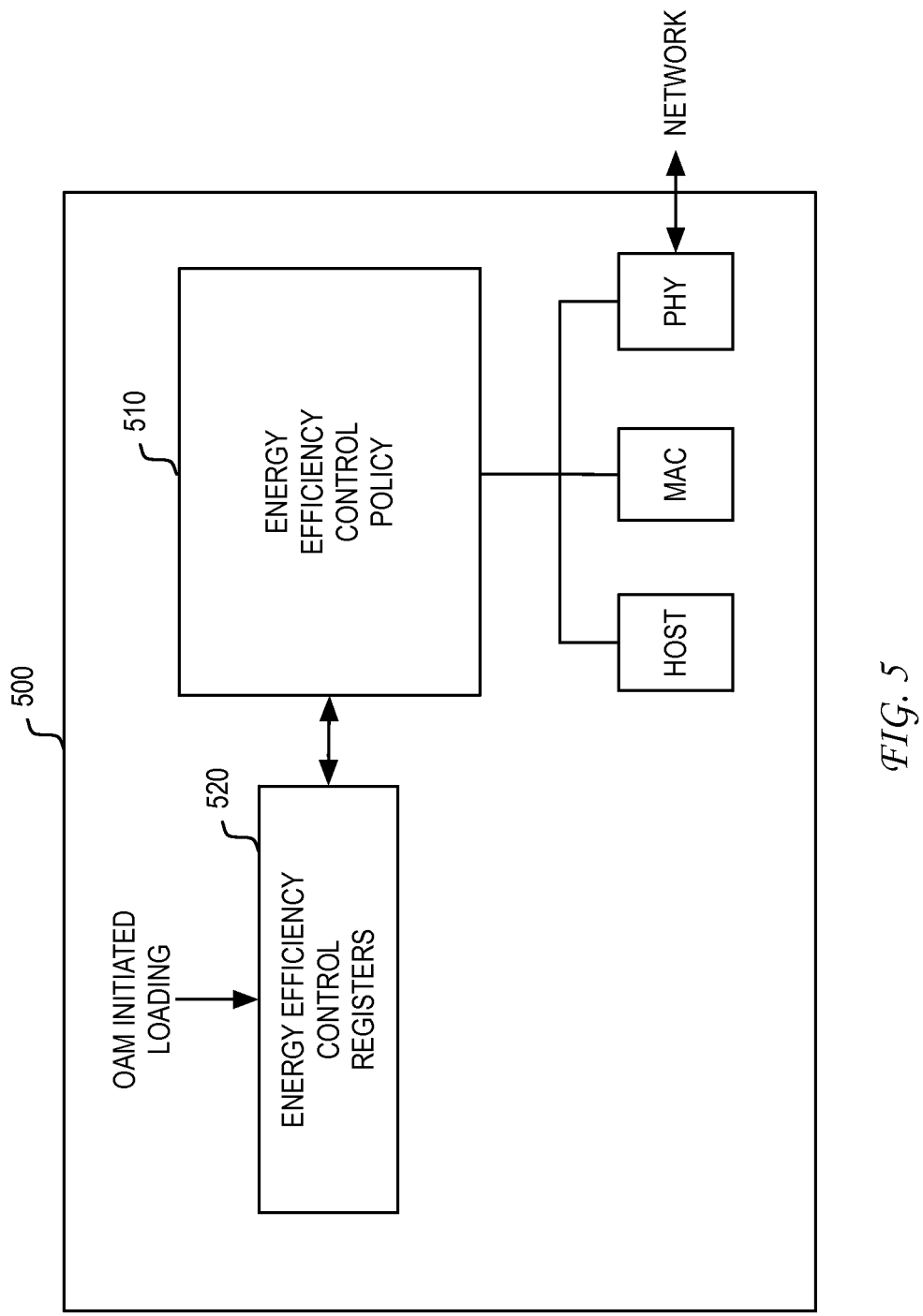
FIG. 5 illustrates an example of a readjustment of an energy efficiency control policy in an optical network unit.

To illustrate such a dynamic configuration, reference is now made to FIG. 5, which illustrates an example of an energy efficiency control system portion of an ONU. As illustrated, the energy efficiency control system portion 500 includes an energy efficiency control policy, which can be designed to interact with and control a PHY, MAC and host as described above. In one embodiment, energy efficiency control policy 510 can operate based on energy efficiency control registers 520 that store various parameters used by energy efficiency control policy 510. In various examples, energy efficiency control registers can include thresholds, alarms, timers, aggressiveness levels, sleep states, wake-up times, available buffering, etc. that can be used in a configuration of operation of energy efficiency control policy 510.

Conventionally, such parameters that are stored in energy efficiency control registers 520 can represent static parameters that are defined through an initial configuration by an IT administrator of the energy efficiency control policy. It is a feature of the present invention that energy efficiency control registers 520 can include values that are loaded with values based on the OAM control in the access portion of the ONU. For example, as the ONU transitions from a sleep state where it is not allowed to transmit anything in the upstream to an awake state, different parameters for energy efficiency control policy 510 can be loaded into the energy efficiency control registers 520 to reflect the change in the access portion of the ONU. For instance, when the access portion of the ONU is in a sleep state, longer wake-up latency can be tolerated for energy efficiency control policy 510 in the upstream side as the packets received from the network would have nowhere to go while the access portion of the ONU is asleep. Conversely, when the ONU is in the awake state and ready to transmit, low latency for its wake-up can be used by energy efficiency control policy 510 to attempt to send through as many packets as possible.

In this example, the access portion of the ONU is cycling through a sleep state and an awake state. By modifying the values in the energy efficiency control registers 520 to address a particular state of the access portion of the ONU, the energy efficiency control policy 510 can be tailored to a state of the ONU. This enables energy efficiency control policy 510 to be tuned to the dynamic state changes instead of being targeted to an average operating state of the access portion of the ONU. Cycle-to-cycle optimization is therefore accomplished by energy efficiency control policy 510, thereby increasing the efficiency of operation.

In one embodiment, the dynamic cycle-to-cycle profile adjustments of the loading of different parameters in energy efficiency control registers 520 can be staggered in relation to the exact ONU wake-sleep cycle. This would ensure that changes in energy efficiency control policy 510 (e.g., wake-up time, latency, etc.) would coincide with realized changes of state in the ONU. Here, it should be noted that the particular mechanism of initiation of the loading of changes to energy efficiency control registers 520 would be implementation dependent. In general, the loading can coincide with control effected by OAM 240 in the access portion of the ONU.

In one embodiment, the operation of the access portion of the OLT/ONU link can also be adjusted by the operation of the energy efficiency control system. For example, utilization and power saving statistics generated by energy efficiency control system can be used to optimize the access protocol for services that sit behind the energy efficiency control system. In that regard, any access parameter that relates to the effective bandwidth (e.g., adjustment of sleep cycle, time of day constraints, bandwidth budgets, etc.) of the OLT/ONU link can be modified based on an indication of usage by services behind the energy efficiency control system.

Figure 6:
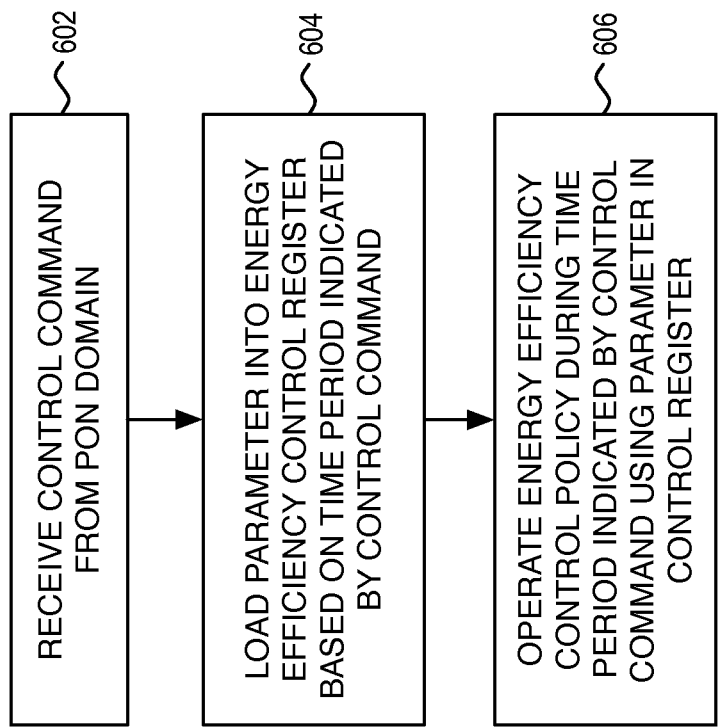
FIG. 6 illustrates an example of a process of the present invention.

Having described a general framework of operation within an ONU, reference is now made to FIG. 6, which illustrates a flowchart of a process of the present invention. As illustrated, the process begins at step 602 where a control command is received by the ONU from the OLT in the PON domain. This control command can be received during service initiation/configuration or during the active operation of the access link. In that regard, the control command can relate to any OAM-processed instruction that can produce an impact on the ONU state, including a sleep cycle, time of day constraints, bandwidth budgets, or any other characteristic having an impact on an effective bandwidth of the ONU.

Based on the received control command, one or more parameters can then be loaded at step 604 into the energy efficient control registers based on a time period indicated by the control command. This time period can be a cyclical time period or can govern an indefinite time period into the future. What is significant is that the one or more parameters that are loaded into the energy efficient control registers are designed to optimize the energy efficiency control policy for a given state of operation of the ONU. After the one or more parameters have been loaded into the energy efficiency control registers, the energy efficiency control policy can then operate at step 606 in an optimized manner based on the loaded parameters in the energy efficiency control registers.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An optical network unit, comprising:
    an optical interface configured to communicate with an upstream optical line terminal via an optical fiber cable in accordance with a passive optical network protocol, the optical network interface configured to receive a control command from the upstream optical line terminal as part of the passive optical network protocol, wherein the control command provides a limitation on an available time period during which the optical network unit can communicate with the optical line terminal over the optical fiber cable;
    a downstream network interface configured for communication with a downstream device;
    an energy efficiency control policy configured to control transitions by at least part of the downstream network interface between different power states; and
    a control register configured to store one or more parameters used by the energy efficiency control policy to control the transitions by the at least part of the downstream network interface, wherein a value of one or more parameters in the control register is modified based on detection of a transition in operating state of the optical interface performed in accordance with the control command.

2. The optical network unit of claim 1, wherein the value of one or more parameters in the control register is modified in response to a transition of the optical interface from an active state to a sleep state in accordance with the control command.

3. The optical network unit of claim 1, wherein the value of one or more parameters in the control register is modified in response to a transition of the optical interface from a sleep state to an active state in accordance with the control command.

4. The optical network unit of claim 1, wherein the at least part of the downstream network interface is a non-optical physical layer device.

5. The optical network unit of claim 1, wherein the one or more parameters includes a parameter that impacts latency of the downstream network interface.

6. The optical network unit of claim 5, wherein the one or more parameters includes a parameter that impacts a length of a wake up time period of the at least part of the downstream network interface.

7. The optical network unit of claim 5, wherein the one or more parameters includes a parameter that impacts an amount of buffering available to the downstream network interface.

8. The optical network unit of claim 1, wherein the downstream network interface is coupled to a non-optical cable.

9. The optical network unit of claim 1, wherein the downstream network interface is an optical interface.

10. The optical network unit of claim 1, wherein the downstream network interface is a wireless interface.

11. A method, comprising:
    receiving, by an optical interface in an optical network unit, a control command from an upstream optical line terminal via an optical fiber cable, wherein the control command provides a limitation on an available time period during which the optical network unit can communicate with the optical line terminal over the optical fiber cable;
    transitioning the optical interface from a first operating state to a second operating state in response to the received control command;
    detecting the transition of the optical interface from the first operating state to the second operating state;
    controlling, by an energy efficiency control policy, based on the detection of the transition of the optical interface from the first operating state to the second operating state, transitions by at least part of the downstream network interface of the optical network unit between different power states;
    communicating, by a downstream network interface in the optical network unit, with a downstream device, by the energy efficiency control policy in the optical network unit, an operation of the downstream network interface in the optical network unit.

12. The method of claim 11, wherein the first operating state is one of an active state and a sleep state, and the second operating state is the other of the active state and the sleep state.

13. The method of claim 11, wherein detecting the transition of the optical interface from the first operating state to the second operating state includes loading parameters from a control register at a time proximate to the transition.

14. The method of claim 11, wherein the at least part of said downstream network interface is a physical layer device.

15. The method of claim 11, wherein the one or more parameters includes a parameter that impacts latency of said downstream network interface.

16. The method of claim 15, wherein the one or more parameters includes a parameter that impacts a length of a wake up time period of the at least part of said downstream network interface.

17. The method of claim 15, wherein the one or more parameters includes a parameter that impacts an amount of buffering available to said downstream network interface.

18. The method of claim 11, wherein the downstream network interface is coupled to a non-optical cable.

19. The method of claim 11, wherein the downstream network interface is an optical interface.

20. The method of claim 11, wherein the downstream network interface is a wireless interface.

* * * * *